United States Patent [19]
Chow et al.

[11] 3,821,207
[45] June 28, 1974

[54] 7-HETEROCYCLIC SUBSTITUTED CEPHALOSPORINS

[75] Inventors: Alfred W. Chow, Radnor; George L. Dunn, Wayne; John R. E. Hoover, Glenside, all of Pa.; Jerry A. Weisbach, Cherry Hill, N.J.

[73] Assignee: Smithkline Corporation, Philadelphia, Pa.

[22] Filed: June 21, 1971

[21] Appl. No.: 155,281

[52] U.S. Cl. ............................ 260/243 C, 424/246
[51] Int. Cl. ........................................... C07d 99/24
[58] Field of Search ............................... 260/243 C

[56] References Cited
UNITED STATES PATENTS
3,641,021  2/1972  Ryan .............................. 260/243 C Primary Examiner—Nicholas S. Rizzo
Attorney, Agent, or Firm—Alan D. Lourie; William H. Edgerton

[57] ABSTRACT

7-Heterocyclic α-amino or α-hydroxyacetamidocephalosporins with various 3-substituents are prepared by conventional 7-acylation and 3-displacement reactions. The products are antibacterial agents.

5 Claims, No Drawings

7-HETEROCYCLIC SUBSTITUTED CEPHALOSPORINS

The invention relates to chemical compounds known as cephalosporins. In particular, the invention relates to cephalosporins with a 7-α-amino or α-hydroxy heterocyclic acetamido group. The compounds are represented by formula I,

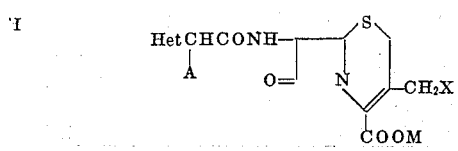

where
Het is a 5 or 6 membered ring containing carbon and at least 2 hetero atoms from the group consisting of O, N, and S;
X is hydrogen, methoxy, acetoxy, methylthio, pyridinium, or Het'-S—;
A is OH or $NH_2$; and
M is H or a pharmaceutically acceptable cation such as an alkali metal or an organic ammonium ion.

Among the groups represented by the designation "Het" are 2-thiazolyl, 4-thiazolyl, 5-thiazolyl, 2-oxazolyl, 4-oxazolyl, 5-oxazolyl, 3-isothiazolyl, 4-isothiazolyl, 5-isothiazolyl, 3-isoxazolyl, 4-isoxazolyl, 5-isoxazolyl, 1,2,3-thiadiazol-4-yl, 1,2,3-thiadiazol-5-yl, 1,2,4-thiadiazol-5-yl, 1,2,5-thiadiazol-3-yl, 1,3,4-thiadiazol-2-yl, 1,2,4-oxadiazol-5-yl, 1,2,4-oxadiazol-3-yl, 1,3,4-oxadiazol-2-yl, imidazol-2-yl, imidazol-4-yl, tetrazolyl, 1,2,3-triazol-4-yl, 1,2,4-triazol-3-yl, pyrazol-3-yl, pyrazol-4-yl, pyrazinyl, pyrimidin-2-yl, pyrimidin-4-yl, pyrimidin-5-yl, pyridazin-3-yl, pyridazin-4-yl, 1,2,3-triazin-4-yl, 1,2,3-triazin-5-yl, 1,2,4-triazin-3-yl, 1,2,4-triazin-5-yl, 1,2,4-triazin-6-yl, and 1,3,5-triazin-2-yl.

While the unsubstituted heterocyclic rings are preferred, the lower alkyl substituted heterocyclic groups named above are also within the definition of the term "Het".

The designation Het' includes all of those groupings represented above by Het and in addition thiophene-2-yl, thiophene-3-yl, furan-2-yl, furan-3-yl, pyrrole-2-yl, pyrrole-3-yl, pyridyl-2-yl, pyridyl-3-yl and pyridyl-4-yl. In this case, the rings can be unsubstituted or can carry lower alkyl (C1-6) substituents, especially methyl.

The compounds of this invention are antibacterial agents, to be used against a wide variety of Gram-positive and Gram-negative infections. They are to be used to prevent or treat these infections in the same manner and dosages as are other, known cephalosporin antibacterial agents. Compounds where A is OH are administered by injection, compounds where A is $NH_2$ are administered by injection or orally. The compounds are formulated in the manner known for other cephalosporin products.

The compounds of the invention are prepared by acylating the 7-position of the appropriate cephalosporin nucleus with the appropriate heterocyclic glycine or heterocyclic glycolic acid. Prior to acylation, it is desirable to protect the amino group with an easily-removable protective group such as t-butoxycarbonyl, benzyloxycarbonyl, trichloroethoxycarbonyl or similar protective group commonly used in the synthesis of peptides. Similarly, the hydroxyl group can be protected for the acylation step by conversion to dichloroacetoxy, tetrahydropyranyloxy, trimethylsilyloxy, formyloxy, or similar commonly used blocking group. For the acylation of the appropriate cephalosporin nucleus, the carboxyl group of the heteroglycine or heteroglycolic acid can be activated by conversion to the acid chloride or to a mixed anhydride with, for example, lower alkyl chloroformates. The carboxyl group also can be activated by conversion to the 2,4-dinitrophenyl ester. If an ester of the cephalosporin nucleus, for example, the benzhydryl or t-butyl ester, is employed, the protected heteroglycine or glycolic acid can be coupled directly to the 7-amino group by using a carbodiimide, such as dicyclohexylcarbodiimide. Alternatively, the protected heteroglycine or glycolic acid can be activated for condensation with the appropriate cephalosporin nucleus ester by reacting it first with carbonyl diimidazole or its equivalent.

When X is H, the starting nucleus will be 7-aminodesacetoxycephalosporanic acid (7-ADCA). When X is acetoxy, the starting nucleus will be 7-aminocephalosporanic acid (7-ACA). Similarly, when X is methoxy, pyridinium, or methylthio, the starting materials are well known. Compounds where X is -Het'-S- can be prepared by acylating 7-aminocephalosporanic acid at the 7-position and then displacing the 3-acetoxy group with the appropriate heterocyclic thiol. When the heteroglycolic acid derivatives are prepared, the protective group can be removed from the hydroxyl after the acylation and prior to displacing the acetoxy group on the 3-position of the nucleus by the heterocyclic thiol. When preparing the heteroglycine derivatives it is necessary to displace the acetoxy group on the 3-position by the appropriate heterocyclic thiol before removing the amino protective group.

Alternatively, cephalosporins in which X is —S Het' can be prepared by first reacting an alkali metal salt of 7-aminocephalosporanic acid with an alkali metal salt of the heterocyclic thiol in, for example, hot aqueous acetone, and subsequently acylating the resulting 3-heterothiomethyl-3-cephem-4-carboxylic acid as described above. The particular reactions involved are all well known to the art. Conversion of the carboxyl group of a final product to a salt is accomplished by well known methods.

The starting heterocyclic glycines, glycolic acids and thiols either are known or are obtained by known methods. The glycines are best prepared by hydrolysis of the corresponding α-aminonitrile or the hydantoin. The preparation of α-aminonitriles and hydantoins is thoroughly described in the literature, for example, by reacting an appropriate aldehyde with hydrogen cyanide and ammonia or ammonium carbonate. Heterocyclic aldehydes are synthesized in variety of ways depending on the heterocyclic ring involved and the availability of suitable starting materials. Such syntheses include the hydrolytic reduction of heterocyclic nitriles prepared, in turn, from the halo-substituted heterocycle and a metal cyanide; by the controlled catalytic or metal hydride reduction of acid chlorides; by oxidation of heterocyclic methanols, for example, using manganese dioxide; by the hydrolysis of heterocyclic methanols, for example, using manganese dioxide; by the hydrolysis of heterocyclic gem-di-halides; by the condensation of lithium heterocycles with dimethylformamide or by treating halomethyl heterocycles with hexamine and subsequently hydrolyzing the quaternary ammonium adduct.

Alternatively, heterocyclic glycines are prepared by reacting α-haloheterocyclic substituted acetic acids with ammonia or by reacting the halo compound with a metal azide and subsequent reduction to the amine. Likewise, either heterocyclic α-keto acids or heterocyclic acetic acids can be converted to the oxime which, in turn, is reduced to the corresponding glycine. Finally, when the halogen atom is sufficiently reactive on a heterocyclic system the halo substituted heterocycle can be reacted with acetamidomalonic ester in the presence of alkoxide ion and the adduct hydrolyzed with decarboxylation to the heterocyclic glycine.

In a similar manner there are a number of synthetic routes for preparing the heterocyclic glycolic acids. Again the choice of method depends on the heterocyclic system involved and the available starting material. Heterocyclic glyoxylic acids are reduced by metal hydrides to give the corresponding heterocyclic glycolic acid. The glyoxylic acid is prepared by reacting the lithium heterocycle with diethyl oxalate or with ethyl oxalyl chloride. Alternatively, the heterocycle may be reacted with ethyl oxalyl chloride in the presence of aluminum chloride. Glycolic acids are also obtained from heterocyclic aldehydes by reaction with hydrogen cyanide and subsequent hydrolysis of the cyanohydrin. Alternatively, heterocyclic methyl ketones are oxidized to the heterocyclic glyoxal using selenium dioxide and this is rearranged by treatment with alkali hydroxides to the α-hydroxy heterocyclic acetic acid. The heterocyclic glycines can be converted to the corresponding glycolic acid by treatment with nitrite ion in an aqueous mineral acid. Additionally, a heterocyclic aldehyde can be reacted with chloroform in the presence of potassium t-butoxide and the resulting α-heterocyclic trichloroethanol is hydrolyzed to the glycolic acid. Finally, heterocyclic α-haloacetic acids are converted to the glycolic acid by treatment with alkali.

As examples, 2-thiazolecarboxaldehyde is prepared from 2-bromothiazole by reaction with butyl lithium followed by reacting the lithium heterocycle with dimethylformamide. The aldehyde reacts with sodium cyanide and ammonium carbonate to give the hydantoin, which upon alkaline hydrolysis generates the 2-thiazolylglycine. Reaction of the 2-thiazolecarboxaldehyde with hydrogen cyanide gives the cyanohydrin which is hydrolyzed by alkali to the 2-thiazolylglycolic acid. In a similar manner the 4- and 5-isomers of thiazolylglycine and thiazolylglycolic acid are prepared from the appropriate thiazole aldehyde. Similarly, the isothiazole-3-acetic acid is converted to its ethyl ester and brominated at the α-carbon atoms using N-bromosuccinimide. Treatment of the α-bromoisothiazole-3-acetic acid ester with hot aqueous alkali and subsequent acidification gives the 3-isothiazoleglycolic acid. Likewise, acid hydrolysis of the α-bromo-3-isothiazoleacetic acid ethyl ester followed by treatment with ammonia in alcohol (sealed tube) yields the 3-isothiazoleglycine. The 4- and 5-isothiazoleglycolic acids and isothiazoleglycines are prepared in an analogous manner. Alternatively, isothiazole-5-glycolic acid is obtained by reducing isothiazole-5-glyoxylic acid with sodium borohydride. 1,2-,3-Thiadiazole-4-carboxaldehyde is prepared from 4-methyl-1,2,3-thiadiazole by α-bromination using N-bromosuccinimide followed by treatment of the bromomethylthiadiazole with hexamethylenetetramine and subsequent steam distillation. The 1,2,3-thiadiazole-4-carboxaldehyde is converted to the corresponding thiadiazole-4-glycolic acid and 4-glycine by reaction with hydrogen cyanide or hydrogen cyanide and ammonia with subsequent hydrolysis. The 1,2,3-thiadiazole-5-glycolic acid and the 5-glycine are made in the same manner starting with 5-methyl-1,2,3-thiadiazole. 1,2,5-Thiadiazole-3-glycolic acid and 3-glycine and the corresponding 1,3,4-thiadiazole analogs can be made by the same reaction sequence starting from 3-methyl-1,2,5-thiadiazole and 2-methyl-1,3,4-thiadiazole, respectively. Similarly, 1,2,4-thiadiazole-3-glycine and 3-glycolic acid are prepared by this reaction sequence starting with 3-methyl-1,2,4-thiadiazole. The 1,2,4-thiadiazole-5-glycine and 5-glycolic acid are prepared by a different route. Here one reacts 5-chloro-1,2,4-thiadiazole with diethyl acetamidomalonate in the presence of sodium ethoxide followed by acid hydrolysis of the C-alkylated product. This yields the 1,2,4-thiadiazole-5-glycine which can be converted to the 5-glycolic acid by reaction with aqueous nitrous acid.

Oxazole-4-carboxylic acid ethyl ester is reduced to oxazole-4-methanol using lithium tri(β-methoxyethoxy) aluminum hydride. This is reacted with activated manganese dioxide in methylene chloride to give oxazole-4-carboxaldehyde. The aldehyde is converted to oxazole-4-glycolic acid and oxazole-4-glycine by the methods already described.

The preparation of 5-isoxazoleglycine is described in Chem. Pharm. Bull. 14, 89 (1966). This compound is converted to the 5-isoxazoleglycolic acid by treatment with aqueous nitrous acid. Alternatively, α-bromo-5-isoxazoleacetic acid when subject to mild hydrolytic conditions yields the 5-isoxazoleglycolic acid. Similarly, isoxazole-3-acetic acid is converted to the ethyl ester. The ester is brominated with N-bromosuccinimide and, after saponification, the resulting bromo acid is reacted with ammonia to give isoxazole-3-glycine. Isoxazole-3-glycolic acid is prepared by an analogous reaction sequence. For the preparation of isoxazole-4-glycolic acid and isoxazole-4-glycine, isoxazole-4-carboxylic acid is converted to isoxazole-4-acetic acid via an Arndt-Eistert reaction and the resulting heterocyclic acetic acid is carried through the reaction sequence just described. Tetrazole-5-glycine and 5-glycolic acid are prepared from the corresponding tetrazole-5-carboxaldehyde via the hydantoin and cyanohydrin, respectively. The 5-tetrazolecarboxaldehyde is prepared by oxidation of 5-hydroxymethyltetrazole using activated manganese dioxide in methylene chloride. 2-Methyltetrazole-5-glycine and the corresponding 5-glycolic acid are prepared starting with 5-dichloromethyltetrazole. This is alkylated using dimethyl sulfate, and the gem-dichloromethyl group is subsequently hydrolyzed to the aldehyde grouping using sodium acetate. The 2-methyltetrazole-5-aldehyde is converted to the glycine and glycolic acid by the methods already described.

Both 1,2,3-triazole-4-carboxaldehyde and 1-methyl-1,2,3-triazole-4-carboxaldehyde are converted to the respective 1,2,3-triazole-4-glycolic acid and 1-methyl-1,2,3-triazole-4-glycolic acid by way of the intermediate cyanohydrins. Likewise, these aldehydes, when subject to the Strecker synthesis, yield the corresponding 1,2,3-triazole-4-glycine and the 1-methyl-1,2,3-triazole-4-glycine. Similarly, 1,2,4-triazole-3-carboxaldehyde and 4-methyl-1,2,4-triazole-3-carboxaldehyde yield the corresponding 3-glycines and 3-glycolic acids via the Strecker and cyanohydrin reaction, respectively. Imidazole-4-glycine [Schneider, Z. Physiol. Chem. 324, 206 (1961)] is converted to imidazole-4-glycolic acid by treatment with aqueous nitrous acid. 1,3,4-Oxadiazole-2-acetic acid can be brominated on the α-carbon atom using N-bromosuccinimide and the bromine atom can be displaced by hydroxyl or amino according to the procedures already described. Pyrazole-3-aldehyde reacts with hydrogen cyanide to give the cyanohydrin, which can then be hydrolyzed to the corresponding pyrazole-3-glycolic acid. If the aldehyde is reacted with sodium cyanide and ammonium carbonate, the hydantoin is obtained which can then be hydrolyzed to pyrazole-3-glycine. Similarly, 1-methylpyrazole is converted to 1-methylpyrazole-4-carboxaldehyde by treatment with dimethylformamide and phosphorus oxychloride. This aldehyde can be converted to 1-methylpyrazole-4-glycolic acid and 4-glycine by the methods described for the 3-pyrazole analogs.

Pyridazine-3-carboxaldehyde, pyrazine-2-carboxaldehyde, pyrimidine-2-carboxaldehyde, pyrimidine-4-carboxaldehyde and pyrimidine-5-carboxaldehyde are known compounds. Pyridazine-4-carboxaldehyde and pyrimidine-2-carboxaldehyde can be prepared from their respective 4- and 2-methyl analogs by reaction with selenium dioxide. All of these aldehydes are converted to the corresponding glycine and glycolic acids via the Strecker synthesis and the cyanohydrin reaction followed by hydrolysis, viz., pyridazine-3-glycolic acid, pyridazine-3-glycine, pyridazine-4-glycolic acid, pyridazine-4-glycine, pyrazine-2-glycine, pyrazine-2-glycolic acid, pyrimidine-5-glycine, pyrimidine-5-glycolic acid, pyrimidine-4-glycine, pyrimidine-4-glycolic acid, pyrimidine-2-glycine, and pyrimidine-2-glycolic acid.

2-Hydroxy-1,3,5-triazine is converted to 2-chloro-1,3,5-triazine by treatment with phosphorus pentachloride. This is coupled with ethyl acetamidomalonate in the presence of sodium ethoxide and the resulting C-alkylated derivative is hydrolyzed to give 1,3,5-triazine-2-glycine. In a similar manner 3-5-dichloro-1,2,4-triazine is reacted with the sodio derivative of diethyl acetamidomalonate and the C-alkylated derivative is hydrolyzed with acid to give 3chloro-1,2,4-triazine-5-glycine. Catalytic hydrogenation in the presence of palladium-on-charcoal results in 1,2,4-triazine-5-glycine. 1,3,5-Triazine-2-glycolic acid is prepared starting with 1,3,5-triazine-2-carboxylic acid by esterification, lithium aluminum hydride reduction to the triazinemethanol, oxidation of the hydroxymethyl group to the carboxaldehyde, reaction of the carboxaldehyde with hydrogen cyanide and subsequent alkaline hydrolysis.

In many cases heterocyclic thiols can be formed directly from the ring closure reaction which generated the heterocycle. For example, chloracetaldehyde and ammonium dithiocarbamate react to give 2-mercaptothiazole. Similarly, thiosemicarbazide condenses with aliphatic acids and acid anhydrides to give 3-alkyl-5-mercapto-1,2,4-triazoles. In some cases the halogen atom on a heterocyclic ring is displaced with sulfur-containing reagents to give the thiol; for example, 2-bromo-5-ethyl-1,3,4-thiadiazole reacts with thiourea to give the thiouronium adduct which is hydrolyzed with aqueous potassium hydroxide to give the thiol. Lithium heterocycles such as 3-thienyllithium react directly with sulfur to produce the thiol. When the intermediate diazonium salt is stable, amino substituted heterocycles are converted to the corresponding thiol by treatment with nitrous acid followed by alkali metal xanthates and subsequent hydrolysis of the xanthate ester. Alternatively, heterocyclic ketones are converted to the corresponding thione by reaction with phosphorus pentasulfide. Finally heterocyclic thiocyanates obtained, for example, by reacting the heterocycle with thiocyanogen, are reduced by metal hydrides to the mercaptan.

As examples, 2-mercaptothiazole is synthesized as described above. Similarly 2-mercapto-5-methylthiazole is prepared by reacting α-chloropropionaldehyde with ammonium dithiocarbamate. 4-Methyloxazole-2-thiol is prepared by reacting hydroxyacetone with thiocyanic acid. 2-Bromo-5-methyl-1,3,4-thiadiazole reacts with thiourea to give the thiouronium adduct which is hydrolyzed with aqueous potassium hydroxide to give the thiol. On the other hand, 1,3,4-thiadiazole-2-thiol with no substituent on the 5-position is prepared by reacting formyl hydrazide with carbon disulfide and ethanolic potassium hydroxide followed by treatment with concentrated sulfuric acid at 0°. 5-Chloro-1,2,3-thiadiazole can be reacted with thiourea and subsequently hydrolyzed with alkali to give 1,2,3-thiadiazole-5-thiol. Similarly, 3-methyl-5-chloro-1,2,4-thiadiazole can be converted to 3-methyl-1,2,4-thiadiazole-5-thiol. Likewise, 4-methyl-1,2,5-thiadiazole-3-thiol is prepared by the same reaction sequence from the corresponding chloro compound. Acethydrazide is reacted with carbon disulfide in ethanol containing potassium hydroxide and the resulting adduct on refluxing in ethanol is converted to 5-methyl-1,3,4-oxadiazole-2-thiol. The parent 1,3,4-thiadiazole-2-thiol is synthesized analogously from formyl hydrazide. Tetrazole-5-thiol is a known compound. The reaction of thiosemicarbazide with acetyl chloride yields 3-methyl-1,2,4-triazole-5-thiol. If 4-methylthiosemicarbazide is substituted in this reaction the product is 3,4-dimethyl-1,2,4-triazole-5-thiol. 2-Mercaptoimidazole as well as its 1-methyl derivative are known compounds. Likewise, 2-mercaptopyrimidine and 4-methyl-2-mercaptopyrimidine are known compounds. Reaction of glyoxal with thiosemicarbazide yields 2-mercapto-1,2,4-triazine. The corresponding 5-methyl analog and the 5,6-dimethyl analog are prepared by reacting thiosemicarbazide with methyl glyoxal and diacetyl, respectively. 2-Mercapto-1,3,5-triazine is obtained by treating the corresponding 2-hydroxytriazine with phosphorus pentasulfide.

The compounds of this invention, because of the assymetric carbon atom in the heterocyclic glycine and glycolic side chain, exist in the form of d and l-isomers. These isomers are separated from a dl mixture by well known resolution methods. This invention is deemed to encompass both the dl mixture and the individual d and l isomers.

The following examples are intended to illustrate the preparation of the intermediates and products of the invention, but are not to be construed as limiting the scope thereof. Temperatures are in degrees Centigrade unless otherwise stated.

EXAMPLE 1

7-Amino-3-(5-methyl-1,3,4-thiadiazol-2-ylthiomethyl)-3-cephem-4-carboxylic acid

A solution of NaHCO$_3$ (8.4 g, 0.10 mol) in 100 ml of water was added gradually to an ice cold, stirring suspension of 7-ACA (13.6 g, 0.05 mol) in water (100 ml) and acetone (50 ml). When all the 7-ACA had dissolved, the solution was heated. When the internal temperature reached 45° a solution of 2-mercapto-5-methyl-1,3,4-thiadiazole (9.8 g, 0.074 mol) in 100 ml of acetone was added. Sufficient 5 percent aqueous NaHCO$_3$ (ca. 50 ml) then was added to raise the pH to ca. 7.6. The temperature was raised to 67° (gentle reflux) and heating was continued at this temperature for 2 hours and 35 minutes. The solution was cooled to 10° and the pH was adjusted to ca. 4 by the addition of 3N HCl. The precipitated solid was collected and washed with acetone to give 12.8 g (74 percent) of product as a light tan solid.

EXAMPLE 2

7-Amino-3-(1-methyltetrazol-5-ylthiomethyl)-3-cephem-4-carboxylic acid)

A solution of NaHCO$_3$ (10.5 g, 0.125 mol) in 125 ml of water was added gradually to an ice cold, stirring suspension of 7-aminocephalosporanic acid (13.6, 0.05 mol) in a mixture of water (100 ml) and acetone (50 ml). The resulting solution was heated and when the internal temperature reached 45° a solution of 1-methyl-5-tetrazolethiol (8.7 g, 0.075 mol) in 100 ml of acetone was added. A 25 ml portion of 5 percent aqueous NaHCO$_3$ was added to raise the pH to ca. 7.6.

Heating was continued until a gentle reflux was reached (70° internal temperature) and then reflux was maintained for 3 hours. The solution was cooled to 10°, acidified to pH 4.0 with 3N HCl and the gold-colored solid was collected and washed with acetone to yield 7.6 g (46 percent) of product.

EXAMPLE 3

Following the procedure outlined in Example 1 substituting an equivalent amount of 2-mercapto-1,3,4-thiadiazole, 2-mercapto-5-methyl-1,3,4-oxadiazole, 2-mercapto-1,3,4-oxadiazole, 3-mercapto-5-methyl-1,2,4-triazole, 3-mercapto-1,2,4-triazole, 3-mercapto-4,5-dimethyl-4H-1,2,4-triazole and 5-mercapto-1H-tetrazole for 2-mercapto-5-methyl-1,3,4-thiadiazole, the following cephalosporin derivatives are obtained:
  7-Amino-3-(1,3,4-thiadiazol-2-ylthiomethyl)-3-cephem-4-carboxylic acid
  7-Amino-3-(5-methyl-1,3,4-oxadiazol-2-ylthiomethyl)-3-cephem-4-carboxylic acid
  7-Amino-3-(1,3,4-oxadiazol-2-ylthiomethyl)-3-cephem-4-carboxylic acid
  7-Amino-3-(5-methyl-1,2,4-triazol-3-ylthiomethyl)-3-cephem-4-carboxylic acid
  7-Amino-3-(1,2,4-triazol-3-ylthiomethyl)-3-cephem-4-carboxylic acid
  7-Amino-3-(4,5-dimethyl-4H-1,2,4-triazol-3-ylthiomethyl)-3-cephem-4-carboxylic acid
  7-Amino-3-(tetrazol-5-ylthiomethyl)-3-cephem-4-carboxylic acid

EXAMPLE 4

When an equivalent amount of the appropriate heterocyclic thiol is substituted for 2-mercapto-5-methyl-1,3,4-thiadiazole in the procedure of Example 1, the following cephalosporin derivatives are obtained:
  7-Amino-3-(1-methyl-2-imidazolylthiomethyl)-3-cephem-4-carboxylic acid
  7-Amino-3-(1,5-dimethyl-2-imidazolylthiomethyl)3-cephem-4-carboxylic acid
  7-Amino-3-(2-thiazolylthiomethyl)-3-cephem-4-carboxylic acid
  7-Amino-3-(5-methyl-2-thiazolylthiomethyl)-3-cephem-4-carboxylic acid
  7-Amino-3-(2-imidazolylthiomethyl)-3-cephem-4-carboxylic acid
  7-Amino-3-(2-oxazolylthiomethyl)-3-cephem-4-carboxylic acid
  7-Amino-3-(5-methyl-2-oxazolylthiomethyl)-3-cephem-4-carboxylic acid
  7-Amino-3-(4(5)-methyl-2-imidazolylthiomethyl)-3-cephem-4-carboxylic acid
  7-Amino-3-(4,5-dimethyl-2-imidazolylthiomethyl)-3-cephem-4-carboxylic acid
  7-Amino-3-(4-methyl-2-oxazolylthiomethyl)-3-cephem-4-carboxylic acid
  7-Amino-3-(4-methyl-2-thiazolylthiomethyl)-3-cephem-4-carboxylic acid
  7-Amino-3-(4,5-dimethyl-2-thiazolylthiomethyl)-3-cephem-4carboxylic acid
  7-Amino-3-(5-amino-2-thiazolylthiomethyl)-3-cephem-4-carboxylic acid
  7-Amino-3-[2-(2-thiazolinylthiomethyl)]-3-cephem-4-carboxylic acid
  7-Amino-3-[2-(2-imidazolinylthiomethyl]-3-cephem-4-carboxylic acid
  7-Amino-3-(5-ethyl-1,3,4-thiadiazol-2-ylthiomethyl)-3-cephem-4-carboxylic acid
  7-Amino-3-(5-amino-1,3,4-thiadiazol-2-ylthiomethyl)-3-cephem-4-carboxylic acid
  7-Amino-3-(5-trifluoromethyl-1,3,4-thiadiazol-2-ylthiomethyl)-3-cephem-4-carboxylic acid
  7-Amino-3-(1-ethyl-5-tetrazolylthiomethyl)-3-cephem-4-carboxylic acid
  7-Amino-3-(1-butyl-5-tetrazolylthiomethyl)-3-cephem-4-carboxylic acid

EXAMPLE 5

When an equivalent amount of 3-amino-5-mercapto-1,2,4-triazole, 1-methyl-1H-1,2,4-triazole-5-thiol, 1-phenyl-3-methyl-1H-1,2,4-triazole-5-thiol, 4-methyl-4H-1,2,4-triazole-3-thiol, 5-mercapto-3-phenyl-1,2,4-triazole, 1-benzyl-1H-tetrazole-5-thiol, 1-propyl-1H-tetrazole-5-thiol or 1-phenyl-1H-tetrazole-5-thiol is substituted for 2-mercapto-5-methyl-1,3,4-thiadiazole in the procedure of Example 1, the corresponding 7-amino-3-heterocyclic thiomethyl-3-cephem-4-carboxylic acid is obtained.

EXAMPLE 6

When an equivalent amount of each of the heterocyclic thiols listed below is substituted for 5-methyl-2-mercapto-1,3,4-thiadiazole in the procedure of Example 1, the corresponding 7-amino-3-heterocyclicthiomethyl-3-cephem-4-carboxylic acid is obtained:
  2-Mercapto-5-phenyl-1,3,4-oxadiazole 2-Mercapto-5-propyl-1,3,4-oxadiazole
5-Benzyl-2-mercapto-1,3,4-oxadiazole
2-Mercapto-5-phenyl-1,3,4-thiadiazole
5-Benzyl-2-mercapto-1,3,4-thiadiazole
3-Mercapto-5-methyl-1,2,4-thiadiazole
3-Mercapto-1,2,4-thiadiazole
5-Mercapto-1,2,4-thiadiazole
5-Mercapto-3-methyl-1,2,4-thiadiazole
5-Mercapto-3-phenyl-1,2,4-thiadiazole
2-Mercaptopyrimidine
2-Mercapto-4-methylpyrimidine
4-Mercapto-pyrimidine
2-Amino-4-mercaptopyrimidine
2-Amino-4-mercapto-6-methylpyrimidine
2-Mercapto-s-triazine
2-Mercapto-4-methyl-s-triazine
3-Mercapto-as-triazine
5,6-Dimethyl-3-mercapto-as-triazine
1,5-Dimethyl-3-mercaptopyrazole
3-Mercaptopyridazine
6-Bromo-3-mercaptopyridazine
3-Mercapto-6-methylpyridazine
2-Mercaptopyrazine
2-Mercaptopyridine
4-Mercaptopyridine
2-Mercapto-6-methylpyridine
2-Mercapto-5-nitropyridine
2-Mercaptopurine
6-Mercaptopurine
8-Mercaptopurine
2-Amino-6-mercaptopurine
4-Mercapto-1H-pyrazole[3,4-d]pyrimidine
2-Mercapto-5-pyridinecarboxamide
5-Amino-2-mercaptopyridine

EXAMPLE 7

7-[2-Amino-2-(4-isothiazolyl)acetamido]-3-(5-methyl-1,3,4-thiadiazol-2-ylthiomethyl)-3-cephem-4-carboxylic acid A solution of 4-isothiazoleglycine (3.16 g, 0.02 mol) in 20 ml of 1N sodium hydroxide is diluted with 10 ml of water and 30 ml of alcohol. N-tert-butoxycarbonylazide (2.9 g, 0.02 mol) is added and the mixture is allowed to stir for 24 hours. The mixture is filtered and the filtrate is concentrated in vacuo, diluted with water and extracted with ether. The separated aqueous phase is acidified to pH 2 with dilute HCl and then is extracted with ethyl acetate. Evaporation of the dried ethyl acetate layer yields α-tert-butoxycarboxamido-4-isothiazoleacetic acid.

To a cold (−10°) stirring solution of α-tert-butoxycarboxamido-4-isothiazoleacetic acid (12.9 g, 0.05 mol) in 200 ml of dry THF containing 6.9 ml (0.05 mol) of triethylamine is added 6.5 ml (0.05 mol) of isobutyl chloroformate during 5 minutes. After stirring at −10° for an additional 10 minutes, a solution of 7-amino-3-(5-methyl-1,3,4-thiadiazolyl-2-thiomethyl)-3-cephem-4-carboxylic acid triethylamine salt, prepared by gradually adding 6.9 ml (0.05 ml) of triethylamine to an ice cold, stirring suspension of 7-amino-3-(5-methyl-1,3,4-thiadiazolyl-2-thiomethyl)-3-cephem-4-carboxylic acid in 180 ml of 50 percent aqueous THF, is added over a 15 minute period at −10°. When the addition is complete stirring is continued at 0°–3° for 1 hour and then at room temperature for another hour. The THF is evaporated in vacuo and the aqueous residue is diluted with 250 ml of water and extracted with ethyl acetate. The aqueous phase is separated, cooled in ice, layered with ethyl acetate and acidified to pH 2.5 with 3N HCl. After separation of the organic phase the aqueous layer is extracted twice with ethyl acetate. The combined, dried (MgSO$_4$) organic extracts are evaporated in vacuo to give the t-BOC-cephalosporanic acid.

The crude acid product is added to ice cold, stirring trifluoroacetic acid and the solution is allowed to stir for 10 minutes in the cold. Excess TFA is evaporated in vacuo and the residue is triturated with ether to yield the desired product as its TFA salt.

The TFA salt is dissolved in water, layered over with MIBK (methyl isobutyl ketone) and cooled in an ice bath while tri-n-butylamine is added dropwise to a pH of 3.8. The precipitated solid is collected and washed successively with MIBK, ethyl acetate and ether to give the desired product as its zwitterion.

EXAMPLE 8

7-[2-Amino-2-(4-oxazolyl)acetamido]-3-(5-methyl-1,3,4-thiadiazol-2-ylthiomethyl)-3-cephem-4-carboxylic acid To a suspension of 1.03 g (0.003 m) of 7-amino-3-(5-methyl-1,3,4-thiadiazol-2-ylthiomethyl)-3-cephem-4-carboxylic acid in 25 ml of THF was added 0.430 g (0.003 m) of 70 percent HClO$_4$ while stirring. Almost a complete solution occurred; 50 mg of insolubles was removed by filtration. To the filtrate was added, dropwise, a solution of 0.570 g (0.003 m) of diphenyldiazomethane in 5 ml of THF. Addition was complete in 45 minutes. Complete discoloration occurred between additions. At the end an 8 percent excess of diphenyldiazomethane was added with a slight retention of color. Reaction mixture stirred for ½ hour. Mixture was poured into 250 ml. of Et$_2$O and the precipitated solid was washed with ether a few times, decanting the supernatant. The solid salt was filtered (never pulled completely dry). The solid was dried in a vacuum desiccator giving 1.37 g — 74.5 percent yield of the perchlorate salt ester.

It was treated with 5 percent bicarbonate solution and the ester extracted with chloroform (3 × 25 ml). The organic layer was dried over MgSO$_4$ and concentrated in vacuo. The residual oil was triturated with CHCl$_3$ — pet ether and filtered; 0.71 g (46.5 percent yield) of the benzhydryl ester of 7-amino-3-(5-methyl-1,3,4-thiadiazol-2-ylthiomethyl)-3-cephem-4-carboxylic acid as an amber solid. IR-NMR supported the proposed structure.

To a solution of 1.02 g (0.002 m) of this ester and 0.48 g (0.002 m) of α-butoxycarboxamido-4-oxazoleacetic acid (prepared as in the first part of example 7) in 40 ml of dry THF and 20 ml of acetonitrile is added 0.412 g (0.002 m) of dicyclohexylcarbodiimide. Contents are stirred at room temperature for 3 hours. The crystalline dicyclohexylurea is removed by filtration. The filtrate is concentrated in vacuo and the residual oil dissolved in a small volume of chloroform and treated with a large volume of ether. The precipitated amber solid is collected and dried to give 7-[α-t-butoxycarboxamido-4-oxazolylacetamido]-3-(5-methyl-1,3,4-thiadiazol-2-ylthiomethyl)-3-cephem-4-carboxylic acid, benzhydryl ester.

To a flask cooled in an ice-bath, containing 1.2 g (0.0016 m) of the above t-butoxyamide is added 5 cc. of ice-cold TFA. Stirring in the cold is continued for 15 minutes. Solvent TFA is removed in the cold applying a vacuum pump. The residual oil is triturated with ether and the light tan solid collected and dried.

This TFA salt is dissolved in 15 cc. of water and stirred for 15 minutes with IR 45 resin. The resin is removed by filtration and the filtrate freeze-dried applying a high vacuum pump to give the product.

EXAMPLE 9

7-[2-(4-Oxazolyl)glycolamido]-3-(1-methyltetrazol-5-ylthiomethyl)-3-cephem-4-carboxylic acid To a solution of 2.86 g (0.02 m) of above 4-oxazoleglycolic acid in 50 ml of ether is added 15 ml. of ethereal diazomethane solution containing 0.03 m of diazomethane. Left to sit at room temperature overnight. The solution is concentrated in vacuo and the residual solid ester is used in a subsequent reaction without further purification.

A solution of above ester, 3 ml of 3,4-dihydropyran and ca. 30 mg of p-toluenesulfonic acid monohydrate in 8 ml. of dry THF is stirred at room temperature for 1 hour. The THF is removed in vacuo, 60 ml. of $CHCl_3$ is added, which is then washed with 5 percent $NaHCO_3$ solution followed by water. The chloroform layer is dried over $MgSO_4$ and concentrated in vacuo to give a colorless oil.

The above oil is reacted at reflux in 50 ml of 2N NaOH solution for 45 minutes. After cooling, the solution is extracted with ether to remove any neutral organics. The pH of aqueous layer is adjusted to 2 with dil. HCl and the acid is extracted with 100 ml of methylene chloride. The organic layer is dried over $MgSO_4$, filtered and concentrated in vacuo to give the protected acid as a gummy oil.

To a solution of 3.6 g (0.0158 m) of the protected acid and 7.8 g (0.0158 m) of 3-substituted nucleus benzhydryl ester (prepared by procedure described in example 8) in 400 ml of dry THF and 200 ml of $CH_3CN$ is added 3.26 g (0.0158 m) of dicyclohexylcarbodiimide. Contents stirred at room temperature for 3 hours. Precipitated dicyclohexylurea is removed by filtration. The filtrate is concentrated in vacuo below 40°C. The residual oil is dissolved in 80 ml of ethyl acetate which is washed with 1.5N HCl solution, 5 percent $NaHCO_3$ solution and then water. The organic layer is dried over $MgSO_4$, filtered and concentrated in vacuo to give a syrup.

The above syrup is put in a cold flask and treated with 25 ml of ice-cold TFA. After stirring for 20 minutes, TFA is removed in vacuo at room temperature. The residue is dissolved in ethyl acetate which is extracted with 5 percent $NaHCO_3$ solution. The aqueous layer is acidified with dil. HCl to pH 2 and is extracted with ethyl acetate. The organic layer is dried over $MgSO_4$, filtered and concentrated in vacuo to yield the product.

EXAMPLE 10

7-[2-Hydroxy-2-(4-thiazolyl)acetamido]-3-(5-methyl-1,3,4-thiadiazol-2-ylthiomethyl)-3-cephem-4-carboxylic acid A solution of 4-thiazoleglycolic acid (1.59 g, 0.01 mol) in 50 ml of dry THF containing 2.0 g of N-trimethylsilylacetamide and 1.5 ml of triethylamine is heated at reflux under nitrogen for 2 hours. The solution is cooled to −10°, treated dropwise with 2.0 ml of isobutyl chloroformate and then allowed to stir at −10° for 20 minutes. To this stirring mixture is added during 30 minutes at −5° a solution of 7-amino-3-(5-methyl-1,3,4-thiadiazol-2-ylthiomethyl)-3-cephem-4-carboxylic acid (3.44 g, 0.01 mol) in 40 ml of 50 percent aqueous THF containing 1.8 ml of triethylamine. After stirring at −5° for 1 hour and at room temperature for 1.5 hr, the THF is evaporated in vacuo and the residue diluted with 40 ml of water. The aqueous solution is extracted with ethyl acetate and the organic extract discarded. The aqueous phase is cooled in ice, layered with ethyl acetate and the pH adjusted to 1.5 with dilute HCl. The separated aqueous phase is extracted twice more with ethyl acetate and the combined organic layers are evaporated in vacuo to give an amber syrup. The syrup is dissolved in a mixture of ethyl acetate and methanol and treated with a slight excess of cyclohexylamine. Dilution with ether precipitates a tan solid which is collected and dried. Reprecipitation from $CHCl_3$-$Et_2O$ gives a light tan solid product identified by IR and NMR spectra.

EXAMPLE 11

7-[2-(5-Isothiazolyl)glycolamido]-3-(1-methyltetrazol-5-yl-thiomethyl)-3-cephem-4-carboxylic acid 5-Isothiazoleglycolic acid (159 g., 1 mole) is dissolved in ethyl acetate (2 l.) and treated dropwise, with stirring, with a solution of diazomethane (10 g./liter) in ether until a yellow color persists in the solution. Removal of the solvent affords the desired methyl ester (173 g., 100 percent). The crude ester is dissolved in dry tetrahydrofuran (1000 ml.) and 3,4-dihydropyran (173 ml.) is added. The reaction mixture is cooled (ice-water bath) and p-toluene-sulfonic acid monohydrate (100 mg.) is added. After 10 minutes the ice bath is removed and stirring is continued for 1 hour. The solvent is removed in vacuo and the residue is treated with 2N sodium hydroxide (3 l.) and gently refluxed for ¾ hour. After cooling to below 10°, the mixture is acidified to pH 2.0 with concentrated hydrochloric acid and extracted with methylene chloride (3 × 2 l.). After drying over magnesium sulfate the solvent is removed in vacuo to afford 5-isothiazolyl-α-o-tetrahydropyranylglycolic acid.

5-Isothiazolyl-α-o-tetrahydropyranylglycolic acid (24.3 g., 0.1 M.) is dissolved in dry tetrahydrofuran (200 ml.) containing 2,4-dinitrophenol (18.4 g., 0.1 M). The mixture is cooled (ice-water bath) and a solution of dicyclohexylcarbodiimide (20.6 g., 0.1 M) in dry tetrahydrofuran (100 ml.) is added dropwise with stirring. When addition is complete (ca. 15 min.) the mixture is allowed to warm to room temperature and is then stirred at this temperature for 1 hour. The precipitate of dicyclohexylurea is filtered off and the solution taken to dryness in vacuo to afford the desired 2,4-dinitrophenyl ester as a yellow syrup. The ester is dissolved in methylene chloride (100 ml.) and added dropwise with stirring to a cooled (ice-water bath) suspension of 7-amino-3-(1-methyltetrazol-5-thiomethyl)-3-cephem-4-carboxylic acid (32.8 g., 0.1 M) in methylene chloride (500 ml.) containing triethylamine (20.2 g., 0.2 M). When addition is complete the reaction mixture is allowed to come to room temperature and is thus maintained for 18 hours. The solvent is removed in vacuo below 40° until a solution volume of 300 ml. is attained; this material is then applied to a column of silica gel (1,500 g.) packed in the solvent system chloroform-methanol-formic acid (90:5:1). Development and elution is performed using the same solvent system and the fractions (20 ml. size) are assayed by t.l.c. (silica gel plates). 2,4-Dinitro phenol is eluted initially followed by the cephalosporin which is obtained as a near colorless gum on removal of the solvent in vacuo (< 40°). This material is treated with ice-cold trifluoroacetic acid (300 ml.) and stirred at 0°–5° for 15 minutes. The solvent is then removed in vacuo below room temperature. The residue is dissolved in methanol (100 ml.), treated with an excess of sodium 2-ethylhexanoate (saturated solution in isopropanol) and added dropwise with vigorous stirring to ether (5 l.). The colorless, amorphous sodium 7-[(5-isothiazolyl)glycolamido]-3-(1-methyltetrazol-5-ylthiomethyl)-3-cephem-4-carboxylate is filtered off and dried in vacuo.

EXAMPLE 12

7-[2-Amino-2-(5-thiazolyl)acetamido]-3-(1-methyltetrazol-5-ylthiomethyl)-3-cephem-4-carboxylic acid To a cold solution of α-tert-butoxycarboxamido-5-thiazoleacetic acid (2.58 g, 0.01 mol) (prepared as described for 4-isothiazole glycine in the first part of Example 7) in 20 ml of THF containing 2,4-dinitrophenol (1.84 g, 0.01 mol) is added, dropwise, a solution of dicyclohexylcarbodiimide (2.06 g, 0.01 mol) in 10 ml of THF. After the addition is complete the mixture is allowed to stir at room temperature for 1 hour. Precipitated dicyclohexylurea is removed by filtration and the filtrate is evaporated in vacuo to give the 2,4-dinitrophenyl ester. This ester is dissolved in 10 ml of $CH_2Cl_2$ and with stirring added dropwise to a cold (5°) suspension of 7-amino-3-(1-methyltetrazol-5-ylthiomethyl)-3-cephem-4-carboxylic acid (3.28 g, 0.01 mol) in 50 ml of $CH_2Cl_2$ containing triethylamine (2.02 g, 0.02 mol). When the addition is complete the mixture is allowed to stir at room temperature for 18 hours. The solvent is removed in vacuo and crude product purified by column chromatography on silica gel. The product obtained from the column is added to ice cold stirring trifluoroacetic acid. After stirring for 10 minutes the TFA is evaporated in vacuo and the residual syrup is triturated with ether to yield the TFA salt of the product. This TFA salt is dissolved in water, passed through on IR-45 ion exchange column and the aqueous eluate is lyphilized to give the desired product as the zwitterion.

EXAMPLE 13

7-[2-(5-Isothiazolyl)glycolamido]-3-(4-H-1,2,4-triazol-3-ylthiomethyl)-3-cephem-4-carboxylic acid Following the procedure outlined in Example 11 but substituting 7-aminocephalosporanic acid for 7-amino-3-(1-methyltetrazol-5-ylthiomethyl)-3-cephem-4-carboxylic acid, the corresponding 7-[2-(5-isothiazolyl)glycolamido]-cephalosporanic acid is obtained. A solution of this cephalosporanic acid (14.0 g, 0.034 mol), 4H-1,2,4-triazole-3-thiol (3.64 g, 0.036 mol) and sodium bicarbonate (2.99 g, 0.036 mol) in 300 ml of pH 6.4 phosphate buffer is heated at 56° for 21 hours under nitrogen. The solution then is cooled in ice, layered over with ethyl acetate and acidified to pH 2 with dilute hydrochloric acid. The combined dried ethyl acetate extracts are evaporated in vacuo and the crude product obtained is purified by column chromatography on silica gel in chloroform-methanol (97:3).

The sodium salt is prepared by adding a slight excess of an acetone-isopropyl alcohol solution of sodium 2-ethylhexanoate to a solution of the free acid in acetone. The precipitate is collected, washed with acetone and dried in vacuo to yield the product.

EXAMPLE 14

7-[2-Amino-2-(4-oxazolyl)acetamido]-3-(5-methyl-4H-1,2,4-triazol-3-ylthiomethyl)-3-cephem-4-carboxylic acid 7-[2-tert-Butoxycarboxamido-2-(4-oxazolyl)acetamido]-cephalosporinic acid is prepared by reacting α-tert-butoxycarboxamido-4-oxazoleacetic acid with 7-aminocephalosporanic acid by the procedure described in part of Example 7 for the preparation of 7-[2-tert-butoxycarboxamido-2-(4-isothiazolyl)-acetamido]-3-(5-methyl-1,3,4-thiadiazol-2-ylthiomethyl)-3-cephem-4-carboxylic acid.

A solution of 7-[2-tert-butoxycarboxamido-2-(4-oxazolyl)acetamido]cephalosporanic acid (1.78 g, 3.59 mmol) and 5-methyl-4H-1,2,4-triazole-3-thiol (0.44 g, 3.78 mmol) in 35 ml of pH 6.2 phosphate buffer containing sodium bicarbonate (0.315 g, 3.78 mmol) is heated at 60° for 21 hours. The solution is cooled to room temperature and extracted with ethyl acetate. The aqueous layer is cooled in ice, layered with ethyl acetate and acidified to pH 2 with dilute hydrochloric acid. The ethyl acetate layer is dried and evaporated in vacuo to yield the crude t-butoxycarboxamidocephalosporin derivative. This material is added to ice cold trifluoroacetic acid and the solution allowed to stir in the cold for 10 minutes. The excess trifluoroacetic acid is evaporated in vacuo and the residue obtained is triturated with ether to give a solid trifluoroacetate salt of the product. The product is converted to its zwitterionic form by dissolving the trifluoroacetate salt in water, passing this solution down a column of IR-45 in ion exchange resin, followed by lyophilization of the eluate to give the product as a solid.

EXAMPLE 15

When the procedure of Example 7 is followed, but using the following heterocyclic glycines instead of 4-isothiazoleglycine, the corresponding 7-(2-amino-2-heterocyclicacetamido)-3-(5-methyl-1,3,4-thiadiazol-2-ylthiomethyl)-3-cephem-4-carboxylic acids are obtained.

Heterocyclic glycine
2-thiazol-2-ylglycine
2-oxazol-2-ylglycine
2-isothiazol-3-ylglycine
2-isoxazol-3-ylglycine
2-thiazol-4-ylglycine
2-imidazol-4-ylglycine
2-oxazol-5-ylglycine
2-isothiazol-5-ylglycine
2-(1,2,3-triazol-4-yl)glycine
2-(1,2,4-triazol-3-yl)glycine
2-isoxazol-5-ylglycine
2-methyloxazol-4-ylglycine

EXAMPLE 16

When the procedure of Example 11 is used with any of the following heterocyclic glycolic acids instead of 2-(5-isothiazolyl)glycolic acid, the corresponding 7-(2- heterocyclic glycolamido)-3-(1-methyltetrazol-5-ylthiomethyl)-3-cephem-4-carboxylic acids are obtained:

2-thiazoleglycolic acid
4-thiazoleglycolic acid
5-thiazoleglycolic acid
4-oxazoleglycolic acid
5-oxazoleglycolic acid
3-isothiazoleglycolic acid
4-isothiazoleglycolic acid
5-isothiazoleglycolic acid
1,2,3-triazole-4-glycolic acid
1,2,4-triazole-3-glycolic acid
isoxazole-5-glycolic acid

EXAMPLE 17

When the procedure of Example 7 is followed using any of the heterocyclicglycines listed in Example 15 and substituting 7-amino-3-methylthiomethyl-3-cephem-4-carboxylic acid for 7-amino-3-(5-methyl-1,3,4-thiadiazol-2-ylthiomethyl)-3-cephem-4-carboxylic acid, the corresponding 7-(2-amino-2-heterocyclic acetamido)-3-methylthiomethyl-3-cephem-4-carboxylic acids are obtained.

EXAMPLE 18

When the procedure of Example 14 is followed using any of the following heterocyclic thiols instead of 4H-1,2,4-triazole-3-thiol and substituting any of the heterocyclicglycines listed in Example 15 for for 4-oxazolylglycine, the corresponding 7-(2-amino-2-heterocyclic acetamido)-3-(heterocyclic thiomethyl)-3-cephem-4-carboxylic acids are obtained.

imidazole-2-thiol
1,2,3-triazole-4-thiol
1,2,3-triazole-5-thiol
1,2,4-triazole-3-thiol
5-methyl-1,2,4-triazole-3-thiol
4-methyl-1,2,4-triazole-3-thiol
pyrazole-3-thiol
pyrazole-5-thiol

EXAMPLE 19

When the procedure of Example 11 is followed using any of the heterocyclic glycolic acids listed in Example 16 instead of 5-isothiazoleglycolic acid and substituting any of the 7-amino-3-heterocyclic thiomethyl-3-cephem-4-carboxylic acids of Examples 3, 4, 5 and 6 in place of 7-amino-3-(1-methyltetrazol-5-ylthiomethyl)-3-cephem-4-carboxylic acid, the corresponding 7-(heterocyclic glycolamido)-3-(heterocyclic thiomethyl)-3-cephem-4-carboxylic acids are obtained.

EXAMPLE 20

When the procedure of Example 12 is followed using any of the following heterocyclic glycines instead of 5-isothiazolylglycine and substituting any of the 7-amino-3-heterocyclic thiomethyl-3-cephem-4-carboxylic acids of Examples 1, 3, 4, 5 and 6 for 7-amino-3-(1-methyl tetrazol-5-yl-thiomethyl)-3-cephem-4-carboxylic acid, the corresponding 7-(2-amino-2-heterocyclic acetamido)-3-(heterocyclic thiomethyl)-3-cephem-4-carboxylic acids are obtained:

2-pyrazinylglycine
2-pyrimidine-2-ylglycine
2-pyrimidin-4-ylglycine
2-pyrimidine-5-ylglycine
2-pyridazin-3-ylglycine
2-pyridazin-4-ylglycine
2-(1,2,4-triazin-5-yl)glycine
2-(1,3,5-triazin-2-yl)glycine
2-(1,2,4-thiadiazol-3-yl)glycine
2-(1,2,4-thiadiazol-5-yl)glycine
2-(1,3,4-thiadiazol-2-yl)glycine
2-(1-methyltetrazol-5-yl)glycine

EXAMPLE 21

When any of the heterocyclic glycolic acids named in Examples 9, 10, 16, or 19 are substituted for 5-isothiazoleglycolic acid in the relevant procedures of Examples 11 and 13, and, suitably protected, are reacted with 7-ACA, the corresponding 7-heterocyclic glycolamidocephalosporanic acid is obtained.

When any of these heterocyclic glycolic acids, including the isothiazole, are reacted with 7-ADCA according to the relevant procedures of Examples 11 and 13, the corresponding 7-heterocyclic glycolamidodesacetoxycephalosporanic acid is obtained.

Similarly, when these glycolic acids, including the isothiazole, are reacted with 7-amino-3-methoxymethyl-3-cephem-4-carboxylic acid or 7-amino-3-pyridiniummethyl-3-cephem-4-carboxylic acid, the corresponding 7-heterocyclic glycolamido-3-methoxymethyl (or 3-pyridiniummethyl)-3-cephem-4-carboxylic acid is obtained.

EXAMPLE 22

When any of the heterocyclic glycines named in Examples 7, 8, 12, 15, 17, 18, or 20, suitably protected as in Example 7, are substituted for the oxazolylglycine in the procedure of Examples 7 and 14 and reacted with 7-ACA, the corresponding 7-heterocyclic glycinamidocephalosporanic acid is obtained.

Similarly, when these glycines, including the oxazole, are reacted with 7-amino-3-methoxymethyl-3-cephem-4-carboxylic acid or 7-amino-3-pyridiniummethyl-3-cephem-4-carboxylic acid, the corresponding 7-heterocyclic glycinamido-3-methoxymethyl (or 3-pyridiniummethyl)-3-cephem-4-carboxylic acids are obtained.

We claim:

1. A compound of the formula

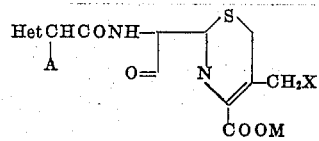

where
Het is unsubstituted or lower alkyl substituted triazolyl bonded to CH through a carbon atom;
X is unsubstituted or lower alkyl substituted triazolylthio, said triazolyl being bonded to the thio atom through a carbon atom;
A is OH or NH₂; and
M is H or an alkali metal.

2. A compound as claimed in claim 1, where A is OH.

3. A compound as claimed in claim 1, where A is NH₂.

4. A compound as claimed in claim 3, being the compound 7-[2-amino-2-(1,2,3-triazol-4-yl)acetamido]-3-(1,2,3-triazol-4-ylthiomethyl)-3-cephem-4-carboxylic acid.

5. A compound as claimed in claim 3, being the compound 7-[2-amino-2-(1,2,4-triazol-3-yl)acetamido]-3-(1,2,4-triazol-3-ylthiomethyl)-3-cephem-4-carboxylic acid.

* * * * *